United States Patent Office 2,935,673
Patented May 3, 1960

2,935,673
ALTERNATING-CURRENT DRIVE FOR SHIP WINCHES AND THE LIKE

Robert Herold, Franz Petschel, Johann Wöll, and Karl Haas, Nurnberg, Germany; said Herold, said Petschel, and said Wöll assignors to Siemens-Schuckertwerke Aktiengesellschaft, Berlin-Siemensstadt, Germany, a corporation of Germany Application August 1, 1955, Serial No. 525,724

Claims priority, application Germany July 31, 1954

7 Claims. (Cl. 318—224)

Our invention relates to alternating-current drives for ship winches, cargo winches and similarly operating equipment.

More particularly, the invention relates to an alternating-current three-phase motor of the twin type which comprises two component induction motors joined to a single unit and having their respective armatures mounted on a common motor shaft. One of the armatures coacts with a field system of a fixed number of poles for low speed operation, whereas the field system for the other armature is selectively operable with two different pole numbers for medium and high speed operation respectively, the three pole numbers having a ratio 8:4:1. Such a twin motor is preferably given 32, 8 and 4 poles respectively. As regards this particular twin motor, our invention is related to the motor disclosed in our copending application Serial No. 497,770, filed March 29, 1955, for "Enclosed and Surface-Cooled Electric Motor for Ship Winches and the Like," assigned to the assignee of the present invention. That application became abandoned after October 21, 1958.

A pole-selectable three-phase motor of the type above mentioned generally satisfies the following requirements applying to marine-winch operation:

(1) Rapid hoisting and lowering of the empty hook.
(2) Rapid hoisting and lowering of frequently occurring light loads up to about one ton.
(3) Slow hoisting and lowering of rarely occurring loads up to two and one-half tons.
(4) Slow hoisting and lowering of rarely occurring sensitive loads up to three tons.
(5) Very slow lifting and setting-down (levelling) of all loads and very slow hoisting and lowering of very sensitive and very rarely occurring loads up to three tons.

It is an object of our invention to further improve such drives as regards achievement of all these requirements while excelling, as to reliability and ease of control operation, the twin-motor drives heretofore disclosed.

We have found that these improvements are obtained if, according to our invention, the rotors of both component motors of the twin unit are given a drooping speed-torque characteristic, and the rotor of the pole-selective component motor is designed as a double-bar rotor whereas the rotor of the fixed pole-member component consists of a resistance rotor.

These and other features of our invention, set forth with particularity in the claims annexed hereto, will be described with reference to the drawings in which—

Figure 1:
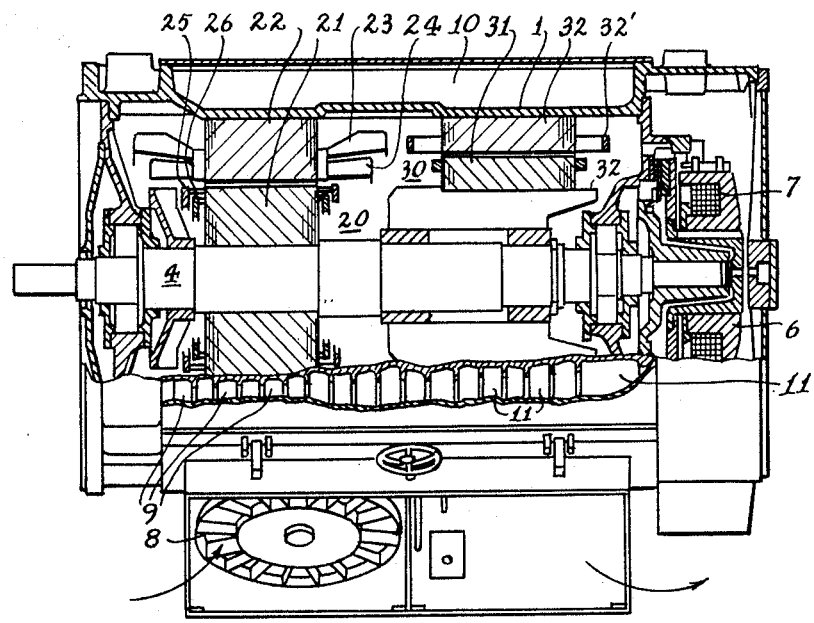
Figure 2:
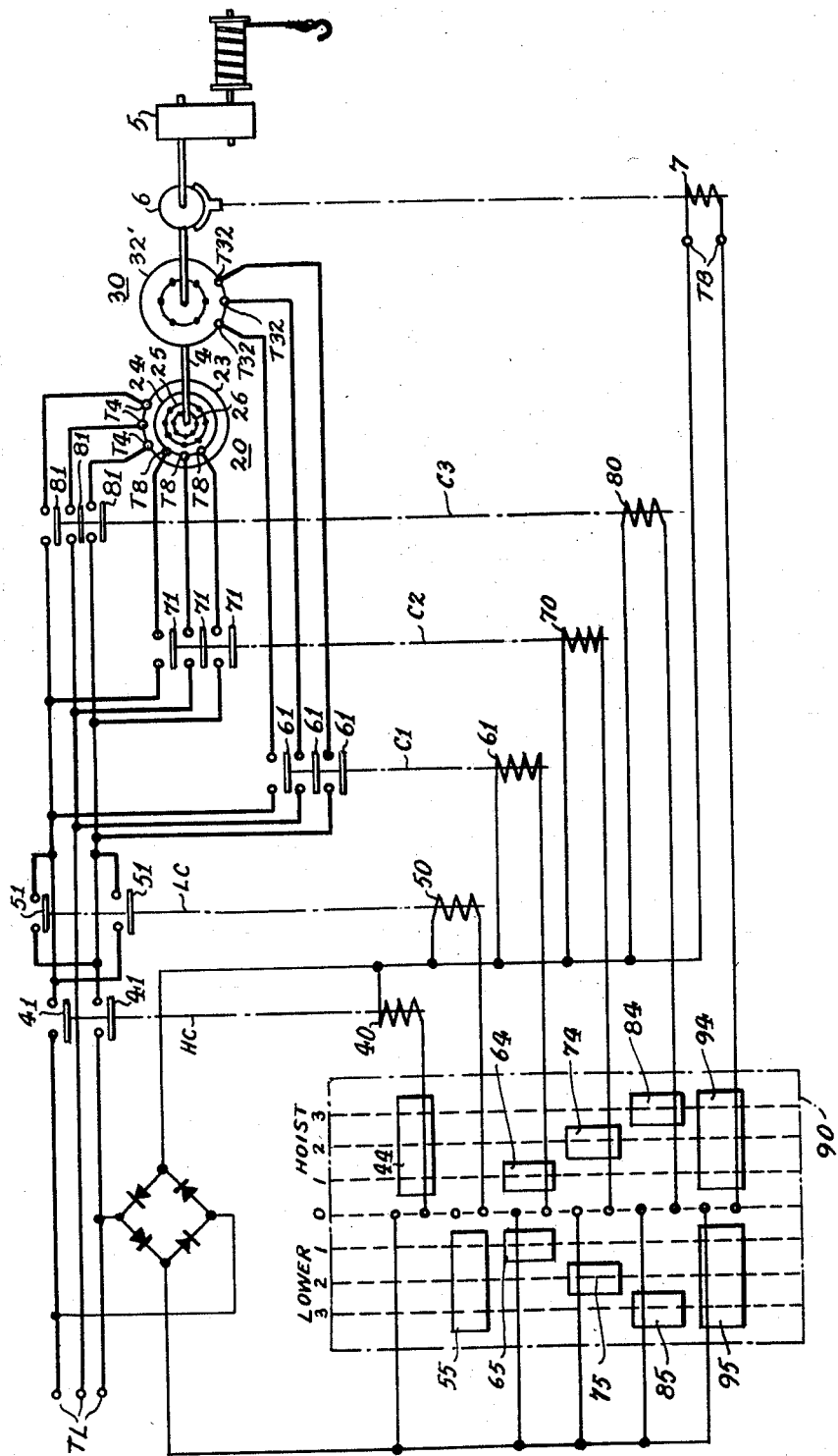
Figure 3:
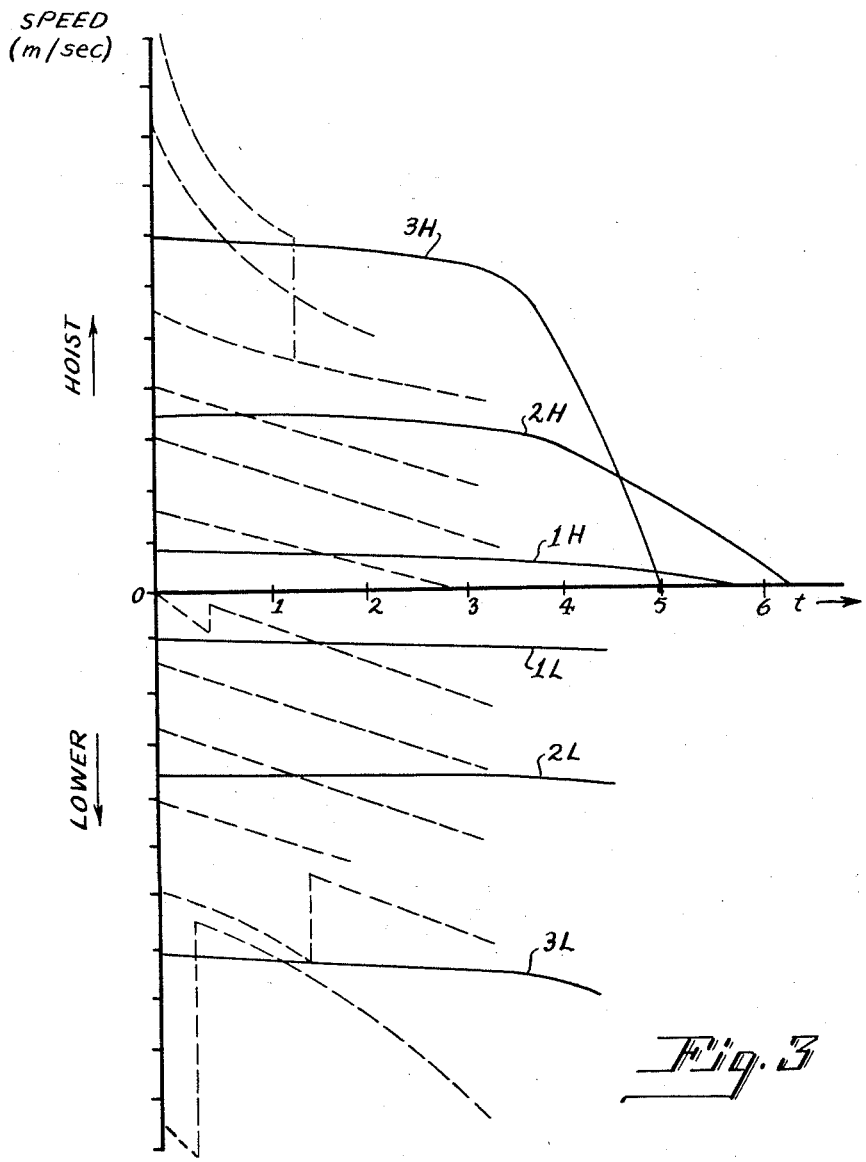

Fig. 1 shows a longitudinal section through a cargo-winch motor of the three-phase twin type according to the invention, Fig. 2 is a schematic circuit diagram of a motor control system including the motor, and Fig. 3 is a speed-torque diagram explanatory of the operation of the motor.

As shown in Fig. 1, the motor has a single, totally enclosed housing 1 which accommodates two individually complete component induction-motor systems 20 and 30 whose respective rotors 21 and 31 are firmly mounted on a common shaft 4 and are surrounded by respective stacks of laminated field structures 22 and 32. The rotor 21 forms a full stack of laminations, whereas the rotor 31 has an annular stack of laminations mounted on radial structures 320 that form intermediate cooling passages thus making this rotor particularly well suited for slow-speed operation. The field structure 22 is equipped with two groups of field windings 23 and 24 of which one is connected to motor terminals T4 (Fig. 2) and, when excited, forms four field poles, while the other group forms eight field poles when its terminals T8 are energized. The field structure 32 (Fig. 1) is provided with only one field winding 32′ of thirty-two field poles connected to motor terminals T32 (Fig. 2).

The rotor 21 of the two-speed motor component is equipped with double bars so as to form two squirrel-cage structures 25 and 26 best suited for the two respective numbers of poles of this component. In contrast, the slow-speed motor component has a resistance rotor with only one set of squirrel-cage bars.

The shaft 4 drives the winch through a reduction gear 5 and carries one of the two friction members of a spring-set and magnetically releasable brake 6 whose control coil 7 is connected to terminals $T_B$ (Fig. 2).

A blower 8 is mounted beneath the bottom of the housing 1 and, when operating, blows air from the outside through channels 9 along exterior cooling ribs of the housing which direct the air first upwardly toward the top of the housing, then about parallel to the axis of the motor through a channel 10 toward the right, and then back downwardly through channels 11 along the housing periphery and out into the atmosphere. As regards these exterior cooling means, the motor is in accordance with the one described and claimed in the copending application Serial No. 458,135, filed September 24, 1954, by K. Haas et al. for "Electric Drive for Ship Winches," issued as Patent 2,783,398 and assigned to the assignee of the present invention.

Although the motor, aside from the brake terminals, has only three sets of terminals to be selectively energized for speed control, it affords a performance that not only meets all above-mentioned requirements of marine winch operation but also more closely approaches the most desired speed-torque characteristics of direct-current operation than the pole-selective alternating-current system heretofore proposed for such purposes. This will be more fully explained below.

According to the motor control system schematically shown in Fig. 2, the three sets of motor terminals T4, T8 and T32 are energized from the three-phase line terminals TL under selective control by a hoist contactor HC and a lowering contactor LC, and also under selective control by three pole-number controlling contactors C1, C2, C3. The hoisting and lowering contactors HC and LC have respective sets of contacts 41, 51 controlled by respective coils 40 and 50. Only one of the two contactors is picked up at a time and then determines the direction of rotation of the motor. Likewise only one of the control contactors C1, C2, C3 is picked up at a time and then determines the speed of the motor. When contactor C1 is picked up the terminals T32 are energized for operating the component motor 30 with 32 poles to run at low speed. When the contactor C2 is picked up the terminals T8 are energized for operating the other component 20 of the twin motor to operate with eight poles at medium speed. When the contactor C3 is picked up, the terminals T4 of the motor component 20 are energized to operate with four poles at maximum speed.

All contactors as well as the brake 6 are shown controlled from a drum-type master controller 90 equipped with contact segments 44, 55, 64, 65, 74, 75, 84, 85, 94, 95.

When the controller 90 is in the illustrated "off" position the brake 6 is set. When the controller is turned to the first position hoist or to any other position, the brake is released and one of the contactors HC, LC is energized together with one of the speed control relays C1, C2, C3. Assume for instance that the master controller is placed in first position hoist. Then the hoist contactor HC has its coil 40 energized through contact segment 44 so that the contacts 41 supply current from the line terminals TL in the phase sequence required to operate the motor in the hoisting direction. Simultaneously the coil 61 of contactor C1 is energized through segment 64 so that contact 61 transmit the current to the terminals T32 of the slow-speed 32-pole component of the twin motor for operation at slowest speed. To mention another example, assume that the controller 90 is placed to third position lowering. Then the lowering contactor LC has its coil 50 energized through segment 55, and simultaneously the coil 80 of contactor C3 is energized through segment 85 for operating the motor component 20 with four poles at highest speed.

In the diagram of Fig. 3, the abscissa or torque axis indicates the weights of the load at the hook in tons, and the ordinate or speed axis indicates the traveling speed of the load during hoisting and lowering in meters per second. The curves 3H, 2H, 1H are the hoisting characteristics of the twin motor for the pole numbers 4, 8 and 32 respectively. Analogously the curves 3L, 2L, 1L are the lowering characteristics for the pole numbers 4, 8 and 32 respectively. It is apparent from the diagram that the six characteristics, shown in full lines, are approximately linear from zero load up to about 3.5 tons. Since due to the drooping characteristic and rotor design in a twin motor according to the invention no formation of saddles in the torque curves can occur, and since the characteristic for each pole number during motor operation as well as during generator operation forms only one intersection with the corresponding torque characteristic in the region of small slip values, it is entirely impossible for the twin motor, when being controlled up or down, usually in the sequence 32–8–4 poles or 4–8–32 poles, to be "caught," i.e. to operate at any speed under high-slip conditions.

When hoisting a load of, for instance, 2.5 tons weight, the twin motor is first run with the characteristic 1H which is produced by the 32-pole component machine having the resistance rotor. This condition is set by placing the controller 90 in first hoisting position. After a short interval of time, the controller is placed into second hoisting position. That is, the operation of the twin motor is now transferred to the 2H characteristic. During this operation the pole-selective motor component is in operation with its 8-pole field winding. As a result, the hook is accelerated in the hoisting direction. When hoisting lighter loads up to about one ton, the operation is so conducted that first the characteristic 1H, then the characteristic 2H and thereafter the characteristic 3H is effective.

Shown by broken lines in Fig. 3 are also the operating characteristics of a corresponding direct-current motor for a cargo-winch drive. It is apparent that the characteristics of the three-phase twin motor according to the invention nearly cover the entire operating range of the direct-current motor. By virtue of the proper choice of the pole numbers, for instance 8, 4, 32, the entire speed range is covered, and by virtue of the above-described design of the squirrel-cage rotors the entire desired load range is covered by characteristics which have a nearly linear course and which are drooping with increasing operating speed.

The above-described control system of Fig. 2 is presented only by way of example and is shown only with respect to its essential components. The generally customary interlocks between the contactors HC, LC for safely preventing simultaneous operation of both may be added and, if desired, a control relay may be interposed between the master controller and the coil of the brake. Such and various other modifications of, and supplements to, the illustrated control system will be obvious to those skilled in the art upon a study of this disclosure and are readily available without departure from the essence of the invention and within the scope of the claims annexed hereto.

We claim:

1. A three-phase induction motor for cargo winches and the like, comprising a housing, a first and a second motor system coaxially disposed in said housing and having a motor shaft in common, said two systems having respective squirrel-cage rotors on said shaft, said first system having a single field-winding group of a fixed pole number, said second system having two field winding groups of respectively different pole numbers and said rotor of said second system having a double set of conductor bars, said rotor of said first system being a resistance rotor having higher resistance than said rotor of said second system, said pole numbers of said first system and said pole numbers of said second system having a ratio of 8:2:1, each of said three field winding groups having separate terminal means for selective operation.

2. A three-phase induction motor for cargo winches, comprising two coaxial motor systems having a single shaft and two rotors on said shaft, said systems having two sets of field windings for said respective rotors, one of said rotors having a full stack of laminations for high-speed operations and having two squirrel-cage conductor structures, the other rotor having an annular stack of laminations and interior cooling passages for slow-speed operation and having a single resistance cage of higher resistance than each of said conductor structures, the one winding set pertaining to said high-speed rotor having two selectively operable winding groups of four and eight field poles respectively, and the other winding set having thirty-two field poles.

3. A winch apparatus for cargo hoisting and lowering operations requiring frequent stopping and starting, the apparatus comprising a winch, a three-phase, triple pole-switchable, twin-motor assembly operably connected to the winch, and a controller system, the twin-motor comprising a squirrel-cage induction motor having two individual induction-motor systems, each system having individual rotors firmly mounted on a common shaft for conjoint rotation about a common axis, each rotor having a drooping speed-torque characteristic, one of the systems having a first rotor comprising an annular stack of laminations and having only one squirrel-cage bar winding, a structure supporting this first rotor in radially spaced relation to the shaft to provide an intermediate cooling passage to facilitate slow-speed operation by this first rotor, the second of the systems having a second rotor comprising a substantially full stack of laminations and having two squirrel-cage bar windings mutually spaced in the radial direction, each of the induction-motor systems being provided with individual three-phase field windings for the respective rotors, the first system having only one slow-speed field winding of thirty-two field poles and motor terminals therefor, the second system having a group of high-speed field windings forming four field poles and motor terminals therefor, the second system having a second group of medium-speed field windings forming eight field poles and motor terminals therefor, the controller system comprising a hoist contactor and a lowering contactor and three pole-number controlling contactors, the controller system being connected between the said twin-motor terminals and three-phase power-line terminals, the hoist contactor and the lowering contactor being selectively connectable to the power-line terminals to determine the direction of motor rotation, only one of the pole-number controlling contactors being then activated to select a single pole number to determine the speed of rotation, there being three speeds for hoisting and three for lowering, the hoisting and lowering characteristics for each pole number being approximately linear from zero load up to about 3.5 tons, said characteristics comprising the coordinate graphs of travelling speed of the loads plotted against the respective loads.

4. A winch apparatus for cargo hoisting and lowering operations requiring frequent stopping and starting, the system comprising a winch, a triple pole-switchable three-phase twin-motor assembly operably connected to the winch, and a controller system, the twin-motor comprising a squirrel-cage induction motor having two individual induction-motor systems, each system having individual rotors firmly connected for conjoint rotation about a common axis, one of the systems having a first rotor, the second of the systems having a second rotor, each of the induction-motor systems being provided with individual three-phase field windings for the respective rotors, the first system having only one slow-speed squirrel-cage field winding of a Z number of field poles and motor terminals therefor, the second system having a group of high-speed squirrel-cage field windings forming an X number of field poles and motor terminals therefor, the second system having a second group of medium-speed squirrel-cage field windings forming a Y number of field poles and motor terminals therefor, X, Y, and Z being in the ratio of 1:2:8, the controller system comprising hoisting and lowering contactor means and three pole-number controlling contactors, the controller system being connected between the twin-motor terminals and three-phase power-line terminals, the hoisting and lowering contactor means being connectable to the power-line terminals to determine the direction of motor rotation, only one of the pole-number controlling contactors being activated to select a single pole number to determine the speed of rotation, there being three speeds for hoisting and three for lowering.

5. A winch apparatus for cargo hoisting and lowering operations requiring frequent stopping and starting, the system comprising a winch, a three-phase, triple pole-switchable, twin-motor assembly operably connected to the winch, a controller system, and three-phase power-line terminals, the twin-motor comprising a squirrel-cage induction motor having two individual induction-motor systems, each system having individual rotors firmly mounted for conjoint rotation on a common shaft about a common axis, each rotor having a drooping speed-torque characteristic, one of the systems having a first rotor comprising an annular stack of laminations and having only one squirrel-cage bar winding, a radially extending structure supporting this rotor in spaced relation to the shaft to provide an intermediate cooling passage to facilitate slow-speed operation by this first rotor, the second of the systems having a second rotor comprising a substantially full stack of laminations and having two squirrel-cage bar windings mutually spaced in the radial direction, each of the induction-motor systems being provided with individual three-phase field windings for the respective rotors, the first system having only one slow-speed field winding of a Z number of field poles and motor terminals therefor, the second system having a group of high-speed field windings forming an X number of field poles and motor terminals therefor, the second system having a second group of medium-speed field windings forming a Y number of field poles and motor terminals therefor, X, Y, and Z being in the ratio of 1:2:8, the controller system comprising a hoist contactor and a lowering contactor and three pole-number controlling contactors, the controller system being connected between the said twin-motor terminals and said three-phase power-line terminals, the hoist contactor and the lowering contactor being selectively connectable to the power-line terminals to determine the direction of motor rotation, only one of the pole-number controlling contactors being then activated to select a single pole number to determine the speed of rotation, the hoisting and lowering characteristics for each pole number being approximately linear from zero load up to about 3.5 tons, said characteristics comprising the coordinate graphs of travelling speed of the loads plotted against the respective loads.

6. A marine winch-hoisting apparatus including a cable winding drum, a motor shaft operably connected to the drum, an externally cooled motor housing enclosing a portion of said shaft, a first three-phase stator disposed within said housing, said stator comprising two separate independently energizable operating windings both adapted for energization from a common three-phase source and each providing a different number of stator poles, the greater number of poles being at least twice the lesser number; a squarrel-cage rotor fixed on said shaft to be driven by said first stator; a second three-phase stator disposed within said housing, said second stator having a single separately energizable operating winding adapted for energization from said common source and providing a number of stator poles at least eight times as great as said lesser number; a hollow squirrel-cage rotor fixed on said shaft to be driven by said second stator; and centrifugal ventilating means disposed within said hollow rotor for cooling said hollow rotor by circulating air within said rotor and into contact with the inner surfaces of said air-cooled housing, said apparatus comprising a triple pole-switchable system providing three speeds in hoisting and three speeds in lowering.

7. A marine winch-hoisting apparatus including a cable winding drum, a motor shaft operably connected to the drum, and an externally cooled motor housing enclosing a portion of said shaft, a first three-phase stator disposed within said housing, said stator comprising two separate independently energizable operating windings both adapted for energization from a common three-phase source and each providing a different number of stator poles, the greater number of poles being substantially twice the lesser number; a squirrel-cage rotor fixed on said shaft to be driven by said first stator; a second three-phase stator disposed within said housing, said second stator having a single separately energizable operating winding adapted for energization from said common source and providing a number of stator poles substantially eight times as great as said lesser number; a hollow squirrel-cage rotor fixed on said shaft to be driven by said second stator; and a plurality of ventilating vanes extending axially through the interior of said hollow rotor and radially between said shaft and the interior of said hollow rotor, said vanes cooling said hollow rotor by circulating air within said rotor and into contact with the inner surfaces of said air-cooled housing.

References Cited in the file of this patent

UNITED STATES PATENTS

| | | |
|---|---|---|
| 771,468 | Falk | Oct. 4, 1904 |
| 1,304,288 | Emmet | May 20, 1919 |

FOREIGN PATENTS

| | | |
|---|---|---|
| 427,868 | Great Britain | May 1, 1935 |